United States Patent [19]
Tsuneda et al.

[11] Patent Number: 5,905,846
[45] Date of Patent: May 18, 1999

[54] IMAGE DECODING APPARATUS AND PROCESS THEREOF AND IMAGE REPRODUCTION APPARATUS

[75] Inventors: Yukihisa Tsuneda; Yoshimasa Hosono; Makoto Shingyouchi; Masahiro Watanabe, all of Kanagawa, Japan

[73] Assignee: Sony Corporation, Japan

[21] Appl. No.: 08/859,778

[22] Filed: May 21, 1997

[30] Foreign Application Priority Data

May 31, 1996 [JP] Japan .................................. 08-138328

[51] Int. Cl.$^6$ .............................. H04N 5/917; H04N 7/26
[52] U.S. Cl. ........................... 386/112; 348/403; 348/416
[58] Field of Search .................................. 386/109, 111, 386/112, 32; 348/384, 390, 400, 401, 403, 404, 405, 406, 407, 408, 409, 410, 411, 412, 413, 414, 415, 416, 699; 382/248, 249, 250, 232, 236; 358/432, 433

[56] References Cited

U.S. PATENT DOCUMENTS 5,625,714 4/1997 Fukuda ..................................... 382/233
5,754,699 5/1998 Sugahara .................................. 382/233

*Primary Examiner*—Wendy Garber
*Assistant Examiner*—Christopher Onvaky
*Attorney, Agent, or Firm*—Ronald P. Kananen; Rader, Fishman & Grauer

[57] ABSTRACT

Input MPEG coded image data is input through a buffer to a variable length decoding unit where it is subject to variable length decoding. The quantized DCT coefficients are output to an inverse quantization unit, while the motion vectors are output to a motion compensation prediction unit. The quantized DCT coefficients are inversely quantized at the inverse quantization unit to generate DCT coefficients. The DCT coefficients have values of the items of frequencies higher than the desired frequency limit converted to 0 at the DCT coefficient conversion unit whereby the motion data found at the format conversion unit is added at the adder and the result input as the original image data to the format conversion unit. The pixels are thinned at the format conversion unit to generate a compressed image which is then displayed on a display unit.

17 Claims, 7 Drawing Sheets

FIG. 6A T $\begin{pmatrix} 1 & 1 & 1 & 0 & 0 & 0 & 0 & 0 \\ 1 & 1 & 1 & 0 & 0 & 0 & 0 & 0 \\ 1 & 1 & 1 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$

FIG. 6B F $\begin{pmatrix} BD & 3F & BD & 20 & 1F & 4D & 0F & 05 \\ 1D & 3C & A1 & 20 & 0F & 2F & 00 & 03 \\ 20 & 6B & 3D & 3F & 12 & 17 & 05 & 01 \\ 04 & AA & 3D & 01 & 05 & 10 & 0C & 00 \\ 00 & 3B & 10 & 00 & 04 & 10 & 09 & 0D \\ 01 & 27 & 01 & 01 & 02 & 07 & 05 & 10 \\ 3C & 8B & 35 & 32 & 00 & 01 & 01 & 03 \\ DB & 00 & 40 & 2D & 00 & 10 & 0F & 02 \end{pmatrix}$

↓ DCT COEFFICIENT CONVERSION

FIG. 6C F' $\begin{pmatrix} BD & 3F & BD & 00 & 00 & 00 & 00 & 00 \\ 1D & 3C & A1 & 00 & 00 & 00 & 00 & 00 \\ 20 & 6B & 3D & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \\ 00 & 00 & 00 & 00 & 00 & 00 & 00 & 00 \end{pmatrix}$

IMAGE DECODING APPARATUS AND PROCESS THEREOF AND IMAGE REPRODUCTION APPARATUS

BACKGROUND OF THE INVENTION

1. Field of the Invention

The present invention relates to an image decoding apparatus for reading and decoding image data coded by the MPEG-1 or other coding system using DCT and recorded for example on a video CD or the like, an image decoding process, and an image reproduction apparatus for displaying the decoded image data on a display device.

2. Description of the Related Art

In the compression and coding of an image, orthogonal transformation is performed so as to reduce redundancy. In this, discrete cosine transformation (DCT) is made wide use of as one method of orthogonal transformation exhibiting the best coding efficiency for the JPEG (color stationary image band compression and coding system of the Joint Photographic Image Coding Experts Group), the MPEG (motion picture coding system of the Motion Picture Coding Experts Group), the H.261 (motion picture compression and coding system for television telephones and television conferences standardized by the ITU-T), and other various coding systems.

The DCT in the MPEG-1 is defined by equation 1.

$$f(u, v) = 1/4 \times 7 \sum_{x=0}^{7} \sum_{y=0}^{7} g(, y)\cos(\Pi(2x+1)u/16)\cos(\Pi(2y+1)v/16) \quad (1)$$

where, x, y are coordinates in pixel space and are integers of 0 to 7, u, v are coordinates (orders) in frequency space and are integers of 0 to 7, g(x,y) is the pixel value at the coordinate (x,y), and f(u,v) is a coefficient (amplitude) of the spatial frequency (u,v).

The original image for transformation is divided into macro blocks of 8×8 pixels, then each macro block is subjected to DCT to obtain coefficients for each of the combinations of the horizontal 0th to 7th and vertical 0th to 7th spatial frequencies.

In the MPEG-1, the DCT coefficient f is quantized, subjected to variable length coding, and converted to one-dimensional information in order from the low frequency component, whereby an MPEG-1 bit stream is generated.

The decoding apparatus for decoding image data coded by such MPEG will be explained next referring to FIG. 1.

FIG. 1 is a block diagram of the configuration of a standard MPEG decoding apparatus 30.

The MPEG coded data input to a decoding apparatus 30 is subjected to variable length decoding at a variable length decoding unit (VLD) 31. The quantization information and the quantized DCT coefficients are input to an inverse quantization unit ($Q^{-1}$) 32, while the motion vectors are input to a motion compensation prediction unit (MC) 35. The quantized DCT coefficient is subjected to inverse quantization at the inverse quantization unit 32 based on the quantization information and is further subjected to inverse DCT at an inverse DCT unit ($DCT^{-1}$) to restore the spatial image data. This spatial image data is added with the motion compensation prediction data output from a motion compensation prediction unit 25 at an adder 34 to generate the original image data. When this image data is an I-picture or P-picture, it is stored in a frame memory (FRM) 36. Further, the motion compensation prediction unit 35 generates motion compensation prediction data based on the motion vector input from a variable length decoding unit 31 based on the image stored in the frame memory 36 and outputs it to the adder 34.

Due to these advances in the technology for compression and coding of image data, it has become possible to record long hours of motion picture data on a disk or other recording medium. As an example of use of the MPEG-1, a video CD etc. have been commercialized.

Further, due to these advances in image processing technology, to enable selection of any image data program, the screen may be divided for example into four or nine sections and a plurality of index images be displayed there or the individual images may be compressed to enable two programs to be simultaneously watched and other various methods of displaying images may be used.

When processing such image data, however, there are sometimes restrictions on the bands of the image data to be processed. In such a case, one generally used method is to use a digital filter for computations among pixels to remove the high frequency component of the spatial frequencies of the image. However, a two-dimensional digital filter for performing processing on image data is comprised of a multiplier, an adder, a plurality of registers, a ROM, delay elements, etc. and therefore there is the problem of a larger circuit size. In particular, in a decoding apparatus of the MPEG etc., since the circuit becomes larger in size, there is a demand for making the circuit simpler. Therefore, further use of digital filters cannot be said to be suitable. Further, the above processing of image data is not preferable in terms of the processing time since high speed processing is sought in many cases.

As cases where limitation of the band of the image data is necessary in this way, mention may be made of the case, explained previously, when compressing image data and displaying it on a screen.

For example, when a compression rate of 1/K (K is an integer) is sufficient, one row is extracted for every K number of rows of the original image and one column for every K number of columns so as to comprise a compressed image. This method is extremely simple in processing and can be realized at a high speed with a simple circuit.

In this method, however, the spatial frequency of the image generated expands into the high frequency side and moire-like noise occurs in the compressed image.

For example, in the case of generating a ½ compressed image such as shown in FIG. 2B by extracting the image for every other column from the image with two columns of white pixels and black pixels mixed alternately as shown in FIG. 2A, the white and black repetitive cycle in the image of FIG. 2A becomes 4 pixels, but is 2 pixels in the image of FIG. 2B. By compressing in ½ in the horizontal direction, the horizontal spatial frequency of the image becomes double.

That is, when the image is compressed without limiting the band of the spatial frequency, the relationship between the maximum spatial frequency fmax-s of the image compressed by the compression rate k (1/K) and the maximum spatial frequency fmax-o of the original image becomes the relationship shown in equation 2 and the band of the compressed image enlarges considerably to the high frequency side:

$$fmax\text{-}s = fmax\text{-}o/k \quad (2)$$

Further, when the spatial frequency of the compressed image exceeds the spatial frequency displayable by the display device, noise is caused in the image.

Accordingly, in such a case, a demand has arisen to cause sufficient attenuation of the frequency component exceeding the limit of the display device.

SUMMARY OF THE INVENTION

An object of the present invention is to provide an image decoding apparatus for decoding coded image data which can limit the band of an image at a high speed by a simple circuit.

Another object of the present invention is to provide such an image decoding process.

Still another object of the present invention is to provide an image reproduction apparatus able to generate and display at a high speed a high quality compressed image free from moire and other noise by a simple circuit.

According to a first aspect of the present invention, there is provided an image decoding apparatus for decoding image data coded using discrete cosine transformation (DCT), provided with a DCT coefficient converting means for converting a coefficient value of a term of a frequency higher than a desired frequency limit of DCT coefficients of the coded image to a value with an absolute value smaller than at least the original coefficient value and an inverse DCT means for performing inverse DCT on the DCT coefficient converted in coefficient value so as to generate spatial pixel data.

According to a second aspect of the present invention, there is provided an image decoding apparatus for decoding coded image data obtained by performing motion compensation prediction on continuous image data, performing DCT on the predictive error signal obtained as a result of the motion compensation prediction or the image data, quantizing the DCT coefficient obtained by the DCT, performing variable length coding on the quantized DCT coefficient, and thereby coding the continuous image data, provided with a variable length decoding means for performing variable length decoding on the coded image data to generate a quantized DCT coefficient, an inverse quantizing means for performing inverse quantization on the generated quantized DCT coefficient to generate a DCT coefficient, a DCT coefficient converting means for converting the coefficient value of a term of a frequency higher than a desired frequency limit of the generated DCT coefficient to a value with an absolute value smaller than at least the original coefficient value, an inverse DCT means for performing inverse DCT on the DCT coefficient converted in coefficient value to generate image data or a predictive error signal, and a motion compensation predicting means for using the generated predictive error signal to generate image data.

According to a third aspect of the present invention, there is provided an image decoding process for decoding coded image data obtained by performing motion compensation prediction on continuous image data, performing DCT on the predictive error signal obtained as a result of the motion compensation prediction or the image data, quantizing the DCT coefficient obtained by the DCT, performing variable length coding on the quantized DCT coefficient, and thereby coding the continuous image data, comprising performing variable length decoding on the coded image data to generate a quantized DCT coefficient, performing inverse quantization on the generated quantized DCT coefficient to generate a DCT coefficient, converting the coefficient value of a term of a frequency higher than a desired frequency limit of the generated DCT coefficient, performing inverse DCT on the DCT coefficient converted in coefficient value to generate image data or a predictive error signal, using the generated predictive error signal to generate image data, and reducing the high frequency component of more than a desired frequency of the spatial frequency of the decoded image to decode the image.

According to a fourth aspect of the present invention, there is provided an image decoding apparatus for decoding image data coded using orthogonal transformation, provided with an orthogonal transformation coefficient converting means for converting the coefficient value of a term of a frequency higher than a desired frequency limit of an orthogonal transformation coefficient of the coded image data to a value with an absolute value smaller than at least the original coefficient value and inverse orthogonal transformation means for performing inverse orthogonal transformation on the orthogonal transformation coefficient converted in coefficient value to generate spatial pixel data.

According to a fifth aspect of the present invention, there is provided an image reproduction apparatus for decoding image data coded using DCT, compressing it by a desired compression rate, and reproducing the same, provided with a DCT coefficient converting means for converting the coefficient value of a term of a frequency higher than a frequency limit, determined based on the compression rate, of the DCT coefficient of the coded image data, an inverse DCT means for performing inverse DCT on the DCT coefficient converted in coefficient value to generate spatial pixel data, an image compressing means for thinning the pixels of the spatial pixel data generated by the inverse DCT means so as to compress the size of the image data comprised of the generated spatial pixel data by the compression rate, and a display means for displaying the compressed image.

BRIEF DESCRIPTION OF THE DRAWINGS

These and other objects and features of the present invention will become more apparent from the following description of the preferred embodiments given with referred to the attached drawings, in which:

FIG. 2A is a view of the original image and FIG. 2B is a view of the compressed image;

FIGS. 6A to 6C are views for explaining the operation of the DCT coefficient conversion unit shown in FIG. 4, wherein FIG. 6A is a view of a selection signal matrix T generated by a selection signal generation unit, FIG. 6B is a view of an input original DCT coefficient matrix F, and FIG. 6C is a view of a DCT coefficient matrix F' converted in coefficient values; FIG. 7A is a view of the image of the original size and FIG. 7B is a view of the image compressed.

DESCRIPTION OF THE PREFERRED EMBODIMENTS

An embodiment of the present invention will be explained with reference to FIG. 3 to FIGS. 7A and 7B.

In this embodiment, an explanation will be made of use for a video CD reproduction apparatus to reproduce motion picture data coded by MPEG-1 and display the same.

Figure 1:
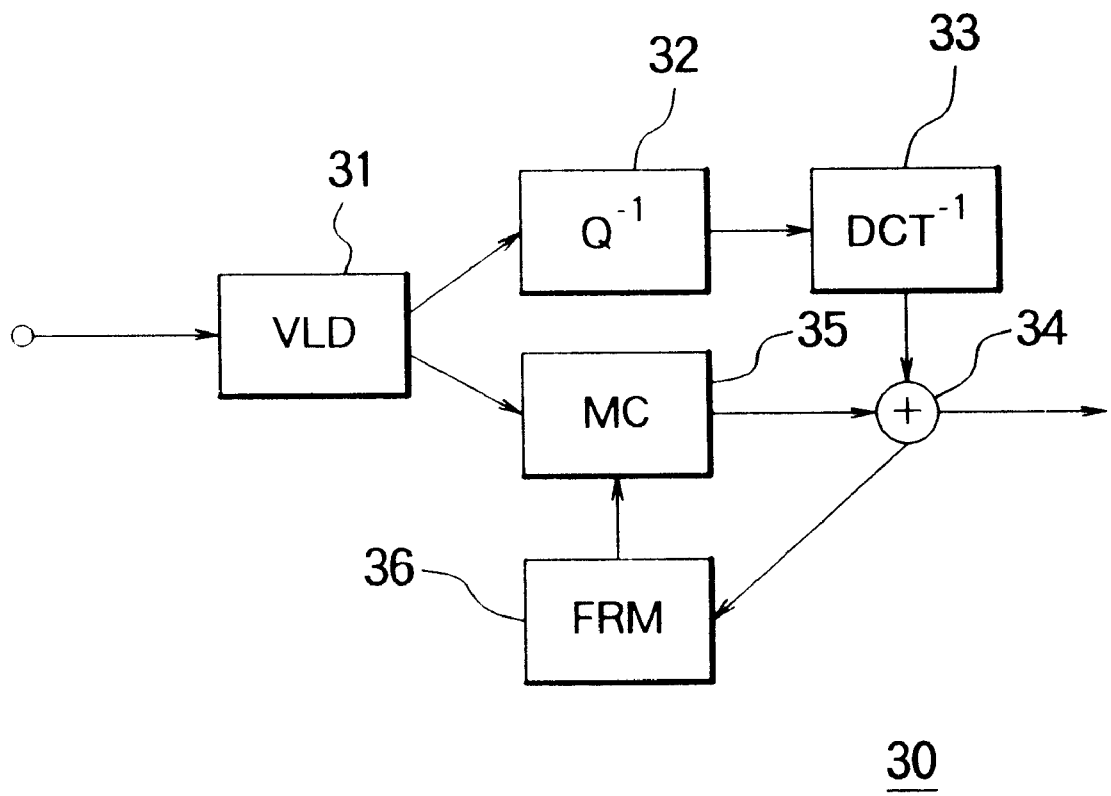
FIG. 1 is a view of the configuration of an image decoding apparatus of the related art.
Figure 2A:
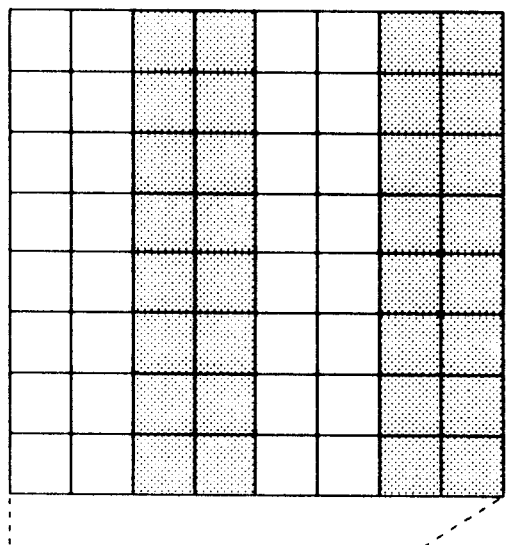
FIGS. 2A and 2B are views for explaining the process for thinning pixels to generate a compressed image where
Figure 2B:
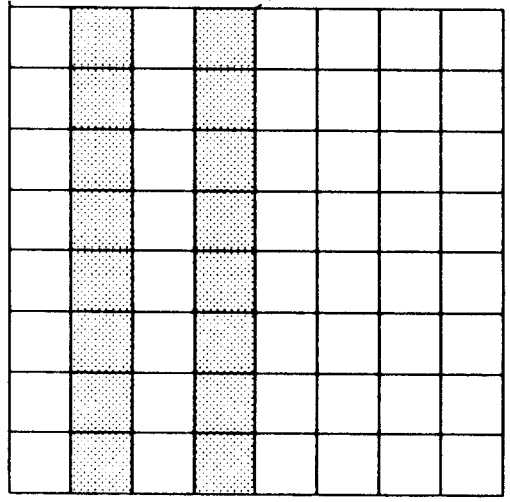
Figure 3:
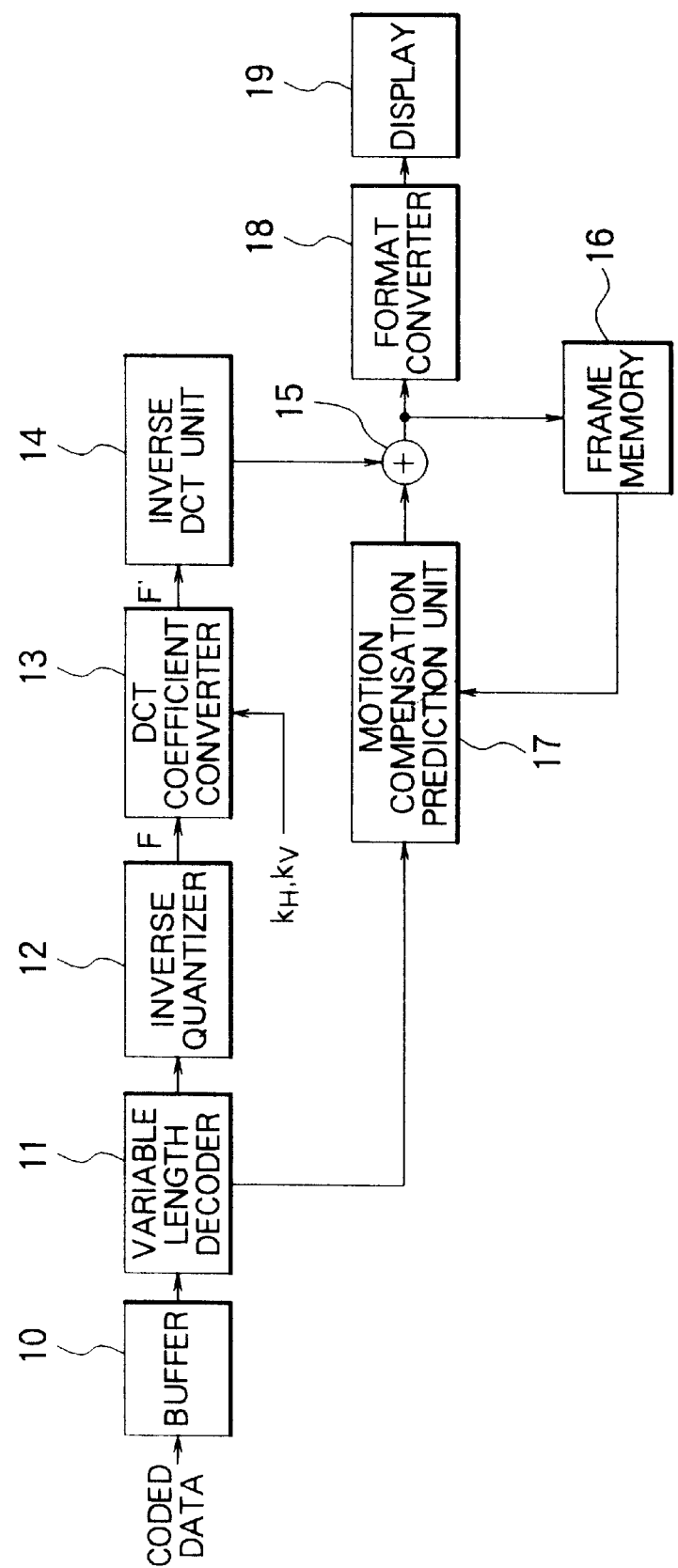
FIG. 3 is a block diagram of the configuration of a motion picture reproduction apparatus according to an embodiment of the present invention.

FIG. 3 is a block diagram of the configuration of the motion picture reproduction apparatus 1.

The motion picture reproduction apparatus 1 has a buffer 10, a variable length decoding unit 11, an inverse quantizing unit 12, a DCT coefficient conversion unit 13, an inverse DCT unit 14, an adder 15, a frame memory 16, a motion compensation prediction unit 17, a format conversion unit 18, and a display unit 19.

First, an explanation will be made of the operation of the different parts of the motion picture reproduction apparatus 1.

The buffer 10 successively receives as input and stores the coded image data read from a video CD.

The variable length decoding unit 11 reads the data stored in the buffer 10. The macro block coded information is decoded by variable length decoding. The coding mode, the motion vectors showing motion of the image, the quantization information, and the quantized DCT coefficients are separated. The decoded motion vectors are output to the motion compensation prediction unit 17, while the quantization information and the quantized DCT coefficients are output to the inverse quantization unit 12.

The inverse quantization unit 12 performs inverse quantization on the quantized DCT coefficients input from the variable length decoding unit 11 based on the quantization information input from the variable length decoding unit 11 as well. The decoded DCT coefficient matrix F is output to the DCT coefficient conversion unit 13.

The DCT coefficient conversion unit 13 uses a predetermined method to convert the coefficient values of the DCT coefficient matrix F input from the inverse quantization unit 12 so as to limit the maximum spatial frequency of the reproduced image so that no moire or other noise occurs in the reproduced image even if compressed by a compression rate based on the compression rates $K_H$ and $k_V$ of a reproduced image input from a control unit, not shown.

This DCT coefficient conversion unit 13 will be explained in further detail referring to FIG. 4.

Figure 4:
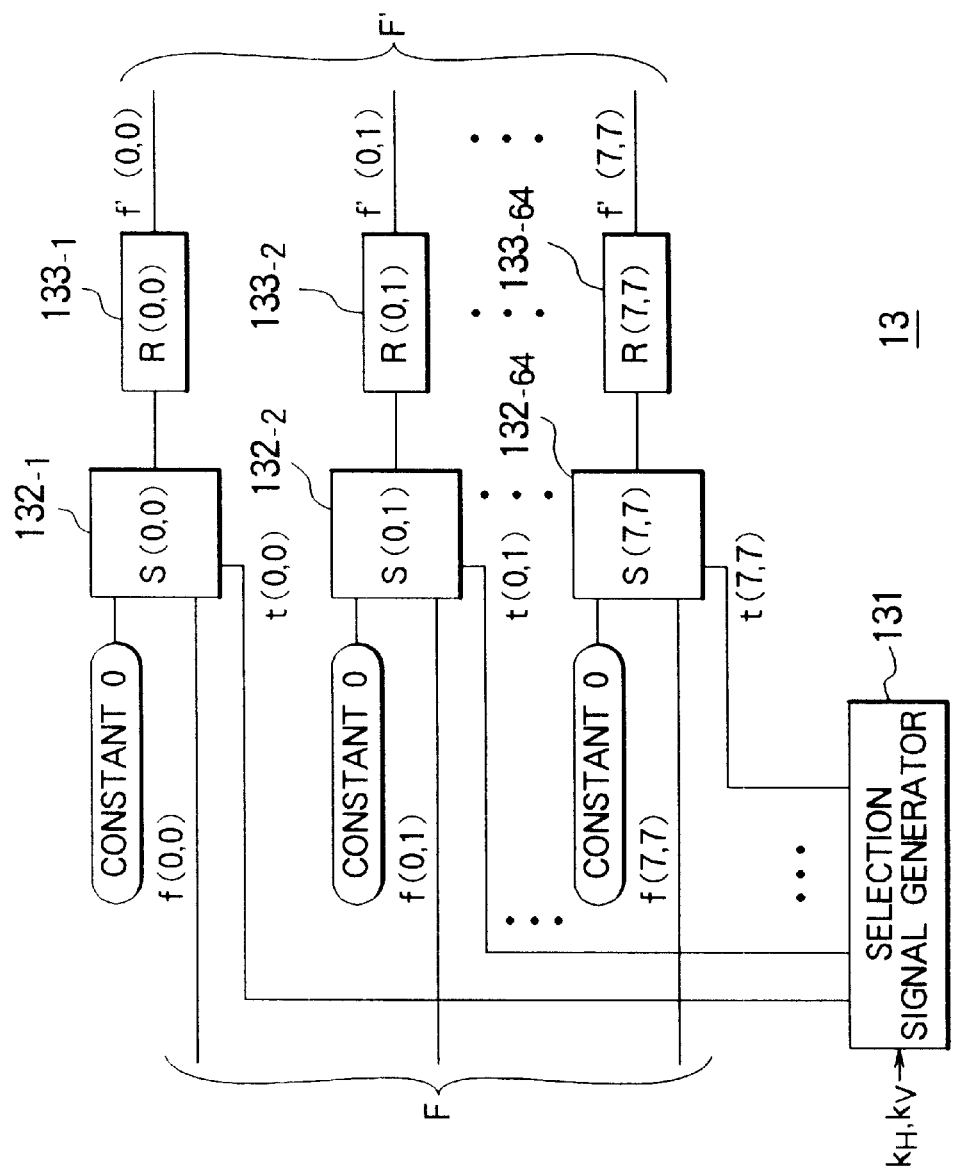
FIG. 4 is a block diagram of the configuration of a DCT coefficient transformation unit of the motion picture reproduction apparatus shown in FIG. 3.

FIG. 4 is a block diagram of the configuration of id the DCT coefficient conversion unit 13.

The DCT coefficient conversion unit 13 is provided with a selection signal generation unit 131, selectors $132_{-1}$ to $132_{-64}$, and registers $133_{-1}$ to $133_{-64}$.

The selection signal generation unit 131 decides on a term for converting the coefficient value in the DCT coefficient matrix F based on the horizontal direction compression rate $k_H$ and the vertical direction compression rate $k_V$ input from a not shown control unit and generates a selection signal matrix T for use for the conversion.

Figure 5:
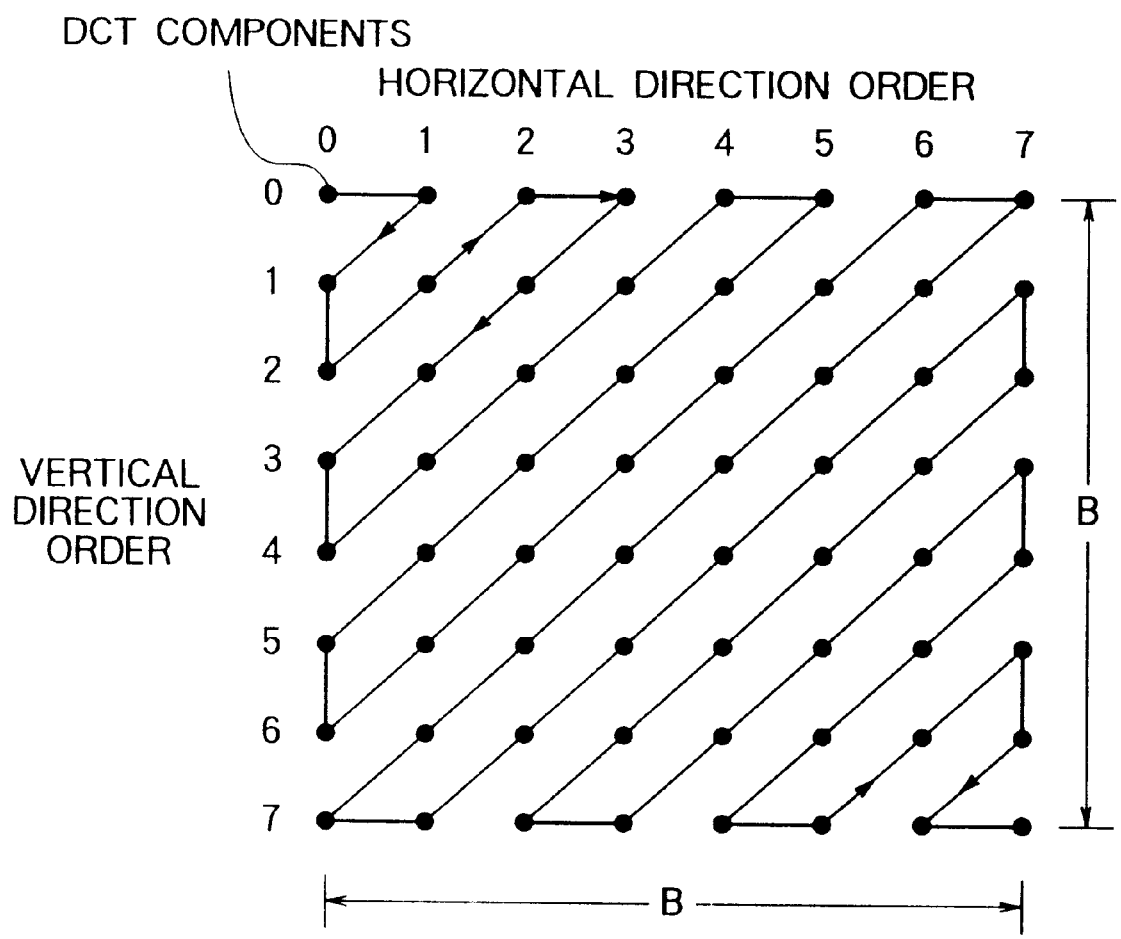
FIG. 5 is a view for explaining the orders in a DCT coefficient matrix.

The DCT coefficient matrix F, as shown in FIG. 5, has a top left term corresponding to the DC component. The frequencies successively become higher to the right bottom later. Further, in the horizontal direction and the vertical direction, the terms become higher in order toward the right in the row direction of the DCT coefficient matrix F and toward the bottom in the column direction. Accordingly, in the selection signal generation unit 131, an order A satisfying equation 3 is found for each of the horizontal direction and vertical direction based on the input horizontal direction compression rate $k_H$ and vertical direction compression rate $k_V$ and the selection signal matrix T is generated so as to convert the coefficient values of the terms of the order a of the DCT coefficients.

$$n \times k - 1 \leq a \qquad (3)$$

where, n is the highest order of the DCT or 7 in this embodiment, k is the compression rate—either the horizontal compression rate $k_H$ or the vertical compression rate $k_V$, and a is the order of the term of the DCT converted in coefficient value Note that when the compression rate k is 1, that is, the image is not compressed at all, the selection signal generation unit 131 generates a selection signal matrix T so as not to convert the coefficient for all orders in that direction.

Note that the selection signal matrix T is a matrix having selection signals corresponding to each term of the DCT coefficient matrix F. The values of the terms are 0 when converting the DCT coefficient values and become 1 when not converting them. That is, the selection signal generation unit 131 sets the value of a term of an order satisfying equation 3 of the selection signal matrix T at 0 and sets the values of the orders not satisfying the same at 1.

The selectors $132_{-1}$, to $132_{-64}$ are selectors provided corresponding to the terms f (j,k) ($0 \leq J \leq 7$, $0 \leq k \leq 7$)of the 8×8 DCT coefficient matrix F. As the value f' (j,k) of the terms of the DCT coefficient matrix F' output to the inverse DCT unit 14, the coefficient value f (j,k) of the DCT coefficient matrix F input from the inverse quantization unit 12 is either output as it is or else output changed to predetermined values.

The selectors $132_{-I}$ (i=1 to 64) receive as input the selection signal t(j,k) of terms of the selection signal matrix T corresponding to the coefficient value f(j,k). When the selection signal t(j,k) is 1, the input coefficient value f(j,k) is output as it is, while when the selection signal t(j,k) is 0, the converted values are output. Note that in this embodiment, the predetermined value is the constant 0.

The registers $133_{-1}$ to $133_{-64}$ are provided corresponding to the 64 selectors and store temporarily the coefficient values selected by the selectors $132_{-1}$ to $132_{-64}$. Due to this, the DCT coefficient matrix F' converted to the desired coefficient values is referred to by the inverse DCT unit 14.

The inverse DCT unit 14 performs inverted DCT on the DCT coefficient matrix F1 converted in coefficient values by the DCT coefficient conversion unit 13 to generate the spatial frequency data. The produced image data is output to the adder 15.

In this embodiment, the inverted DCT is performed based on equation 4.

$$[X] = (\tfrac{1}{4})[N'][F'][N] \qquad (4)$$

In equation 4, the matrix X is comprised of 8×8 real space image data, while the matrix F' is an 8×8 DCT coefficient matrix.

Further, the matrix N is an 8×8 constant matrix for converting the matrix F' shown in equation 5 to the matrix X while the matrix N' is a transposed matrix of the matrix N shown in equation 6.

$$[N] = \begin{vmatrix} +a4 & +a4 & +a4 & +a4 & +a4 & +a4 & +a4 & +a4 \\ +a1 & +a3 & +a5 & +a7 & -a7 & -a5 & -a3 & -a1 \\ +a2 & +a6 & -a6 & -a2 & -a2 & -a6 & +a6 & +a2 \\ +a3 & -a7 & -a1 & -a6 & +a6 & +a1 & +a7 & +a2 \\ +a4 & -a4 & -a4 & +a4 & +a4 & -a4 & -a4 & +a4 \\ +a5 & -a1 & +a7 & +a3 & -a3 & -a7 & +a1 & -a5 \\ +a6 & -a2 & +a2 & -a6 & -a6 & +a2 & -a2 & +a6 \\ +a7 & -a5 & +a3 & -a1 & +a1 & -a3 & +a5 & -a7 \end{vmatrix} \quad (5)$$

where, ai=cos(I×π/16) I=1 to 7

$$[N'] = \begin{vmatrix} +a4 & +a1 & +a2 & +a3 & +a4 & +a5 & +a5 & +a7 \\ +a4 & +a3 & +a6 & -a7 & -a4 & -a1 & -a2 & -a5 \\ +a4 & +a5 & -a6 & -a1 & -a4 & +a7 & +a2 & +a3 \\ +a4 & +a7 & -a2 & -a5 & +a4 & +a3 & -a6 & +a1 \\ +a4 & -a7 & -a2 & +a5 & +a4 & -a3 & -a6 & +a1 \\ +a4 & -a5 & -a6 & +a1 & -a4 & -a7 & +a2 & -a3 \\ +a4 & -a3 & +a6 & +a7 & -a4 & +a1 & -a2 & +a5 \\ +a4 & -a1 & +a2 & -a3 & +a4 & -a5 & +a6 & -a7 \end{vmatrix} \quad (6)$$

where, ai=cos(I×π/16) I=1 to 7

When the image data output from the inverse DCT unit 14 is an image of the motion compensation prediction mode, the adder 15 adds the image data and the motion compensation prediction data output from the later mentioned motion compensation prediction unit 17 for every macro block to generate the original image data. The generated image data is output to the format conversion unit 18 and, when that image data is an I-picture or P-picture, is output to the frame memory 16 as well.

The frame memory 16 is a memory for storing images used as reference images in the later decoding processing among the image data generated by the adder 15. Specifically, it stores the I-pictures and P-pictures out of the image data output from the adder 15.

The motion compensation prediction unit 17 refers to the image data stored in the frame memory 16 and based on this performs motion compensation prediction based on the motion vector input from the variable length decoding unit 11 and outputs the resultant block data to the adder 15.

The format conversion unit 18 successively puts together one picture after another from the image data for each macro block input from the adder 15, rearranges them in the order of the original pictures, and further performs changes in the size of the image in accordance with need and outputs the result to the display unit 19. When converting the size of the image, in particular when compressing an image, the image is compressed by substantially the same compression rates as the horizontal compression rate $k_H$ and vertical compression rate $k_V$ used in the DCT coefficient conversion unit 13 under the control of a not shown control unit. In other words, when compressing an image by the format conversion unit 18, the compression rate is input to the DCT coefficient conversion unit 13 and the DCT coefficients are converted in the DCT coefficient conversion unit 13 so as to generate an image suitable for compression.

The display unit 19 is a CRT device or other display device and displays the image output from the format conversion unit 18.

Next, an explanation will be made of the operation of the motion picture reproduction apparatus 1 referring to FIGS. 6A to 6C and FIGS. 7A and 7B.

Note that here an example is given of the case of displaying an image reproduced from a video CD compressed to ½ in the horizontal direction and in the vertical direction so as to explain the operation of the motion picture reproduction apparatus 1.

The coded image data read from the video CD is stored successively in the buffer 10 and successively read out and decoded by the variable length decoding unit 11, whereby the motion vectors showing the movement of the image and quantized DCT coefficients etc. are generated. The generated quantization information and quantized DCT coefficients are input to the inverse quantization unit 12 at which the quantized DCT coefficients are inversely quantized based on the quantization information and thereby the DCT coefficient matrix F shown in FIG. 6B is restored.

The restored DCT coefficient matrix F is converted in coefficients in the DCT coefficient conversion unit 13 in accordance with the image compression rate. As explained above, here, since the size of the image is compressed to ½ both in the horizontal direction and the vertical direction, the horizontal compression rate $k_H$ and the vertical compression rate $k_V$ both become 0.5 and the orders a satisfying equation 3 becomes 3 to 7. As a result, in the selection signal generation unit 131 of the DCT coefficient conversion unit 13, the selection signal matrix T is generated so that the terms corresponding to the orders above the third order, both in the row direction and column direction shown in FIG. 6A, become 0 and the DC component and the terms corresponding to the first order and second order become 1.

Further, based on the selection signal matrix T, the coefficient values are selected at the selectors $132_{-1}$ to $132_{-64}$ of the DCT coefficient conversion unit 13 and the coefficient matrix F' shown in FIG. 6C is generated with respect to the coefficient matrix shown in FIG. 6B.

Figure 7A:
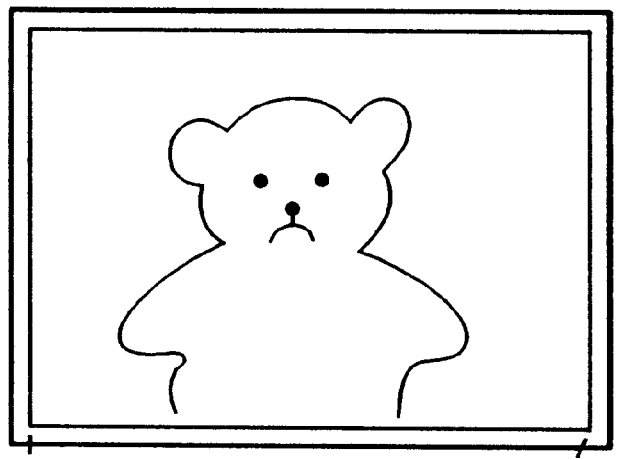
FIGS. 7A and 7B are views for explaining an image displayed on a display unit of the motion picture reproduction apparatus shown in FIG. 3, where
Figure 7B:
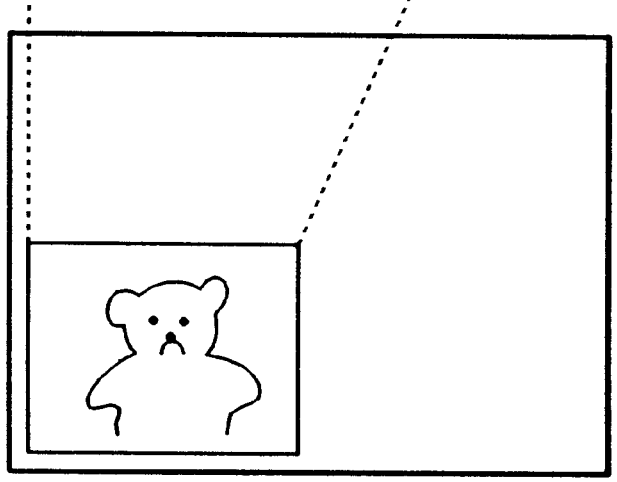

The generated DCT coefficient matrix F' is subjected to inverse DCT by the inverse DCT unit 14 based on equation 4 to restore the spatial image data, the motion compensation predictive data is added by the adder 15, and the original image data such as shown for example in FIG. 7A is generated successively with every macro block. Further, the format conversion unit 18 thins the pixels in the horizontal and vertical directions to reduce the size of the image to ½, whereby for example the ½ compressed image shown in FIG. 7B is generated and displayed on the display unit 19.

The image data input to the format conversion unit 18 is cut to remove the high frequency component of the original image and the bandwidth is cut to less than ½ as shown in FIG. 6C. Accordingly, even if the pixels are thinned to ½ to shift the band to the high frequency side in the format conversion unit 18, a ½ compressed image free from moire and other noise is displayed without exceeding the bandwidth of the original image, that is, the frequency of the limit able to be suitably displayed on the display unit 19.

In this way, in the motion picture reproduction apparatus 1 of this embodiment, it is possible to limit the band of the spatial frequency of the reproduced image by just adding a simple circuit. As a result, it is possible to display a suitable image free from moire-like noise even when displaying an image on a display device compressed.

Note that the present invention is not limited to the above embodiment and can be modified in various ways.

For example, the configuration of the DCT coefficient conversion unit 13 for converting the coefficient value of the inversely quantized DCT coefficient matrix F may be any configuration and is not limited to that of this embodiment.

For example, in this embodiment, the configuration enabled parallel conversion of the coefficient values by 64 selectors, the same number as the coefficients, but the configuration may also be one in which the coefficients are converted by serial processing. Further, the DCT coefficient conversion unit 13 as a whole may be configured by a general use processor.

Further, as the converted coefficient values in the case of converting coefficients, in this embodiment, they may be made 0 across the board, but any values are acceptable so long as they are smaller than the original coefficient values. For example, processing may be performed to convert the original coefficient values to 1/L (L>1).

Further, in this embodiment, the explanation was made of the case of playing back a video CD on which was recorded image data coded by the MPEG-1, but the invention is not limited to these coding methods or source of image data and can be applied to the reproduction of any coded image data coded using DCT and input in any form.

That is, it may also be applied to various image data coded by the MPEG-2, JPEG, H.261, and other standards.

Further, the present invention may also be applied to for example optical disk apparatuses, magneto-optic (MO) disk apparatuses, VTR apparatuses, and other reproduction apparatuses for reproducing coded data recorded on any type of medium in addition to video CDs and can further be applied to apparatuses for decoding and reproducing coded data sent via a broadcasting network, cable television network, etc.

Further, in this embodiment, the case of use of the present invention was shown by way of illustration so as to suitably display an image without occurrence of noise when displaying it compressed on a screen. The present invention, however, may also be applied to other applications requiring limitation of the bandwidth of the reproduced image and is not limited in range of application. For example, when it is necessary to transmit image data through a narrow bandwidth analog transmission route etc., the present invention may be applied so as to adjust the bandwidth.

The present invention can also be applied to orthogonal transformation other than DCT for example wavelet transformation.

According to the image decoding apparatus and image decoding process of the present invention, since the frequency is limited by converting the DCT coefficient before performing inverse DCT, there is no need for a filter etc. and it becomes possible to limit the bandwidth of an image generated at a high speed by a simple circuit.

Further, according to the image reproduction apparatus of the present invention, since the bandwidth of the decoded image is limited so that the bandwidth of the compressed image falls within the bandwidth displayed suitably on the display device by converting the DCT coefficient before performing inverse DCT in accordance with the compression rate of the image, it becomes possible to generate and display at a high speed a high quality compressed image free from the occurrence of moire and other noise by a simple circuit.

What is claimed is:

1. An image decoding apparatus for decoding image data coded using discrete cosine transformation (DCT), comprising:

a DCT coefficient converting means for converting a coefficient value of a term of a frequency higher than a desired frequency limit, determined based on a compression rate, of a DCT coefficient of said coded image into a value with an absolute value smaller than at least the original coefficient value and an inverse DCT means for performing inverse DCT on the DCT coefficient converted to said coefficient value so as to generate spatial pixel data.

2. An image decoding apparatus as set forth in claim 1, wherein said DCT coefficient converting means converts the coefficient value of the term of an order a satisfying equation 7 of said DCT coefficient to a value of an absolute value smaller than at least said original coefficient value:

$$n \times k - 1 \leq a \tag{7}$$

where, n is the highest order of the DCT coefficient and k is the compression rate shown by k in the case of compressing an image of m×n pixels to a similar image of (m×k)×(n×k) pixels, where 0<k<1.

3. An image decoding apparatus as set forth in claim 1, further comprising an image compressing means for compressing the size of said image data in a horizontal direction and vertical direction by any compression rate and wherein said DCT coefficient converting means converts the coefficient value of the term of a horizontal direction order $a_H$ satisfying equation 8 of said DCT coefficients and a vertical direction order $a_v$ satisfying equation 9 to a value with an absolute value smaller than at least the original coefficient value:

$$n_H \times k_H - 1 \leq a_H \tag{8}$$

$$n_v \times k_v - 1 \leq a_v \tag{9}$$

where, $n_H$, $n_v$ are the highest orders of the DCT coefficients in the horizontal direction and vertical directions and $k_H$, $k_v$ are the compression rates in the horizontal direction and vertical direction in the case of compressing an image of m×n pixels to $(m \times k_H) \times (m \times k_v)$ in said image compressing means, where 0<$k_H$, $k_v$<1.

4. An image decoding apparatus for decoding coded image data obtained by performing motion compensation prediction on continuous image data, performing DCT on the predictive error signal obtained as a result of said motion compensation prediction or said image data, quantizing the DCT coefficient obtained by said DCT, performing variable length coding on the quantized DCT coefficient, and thereby coding said continuous image data, said apparatus comprising:

a variable length decoding means for performing variable length decoding on said coded image data to generate a quantized DCT coefficient, an inverse quantizing means for performing inverse quantization on said generated quantized DCT coefficient to generate a DCT coefficient, a DCT coefficient converting means for converting the coefficient value of a term of a frequency higher than a desired frequency limit, determined based on a compression rate, of said generated DCT coefficient to a value with an absolute value smaller than at least the original coefficient value, an inverse DCT means for performing an inverse DCT on the DCT coefficient converted in coefficient value to generate image data or a predictive error signal, and a motion compensation predicting means for using said generated predictive error signal to generate image data.

5. An image decoding apparatus as set forth in claim 4, wherein said DCT coefficient converting means converts the coefficient value of a term of an order a satisfying equation 10 of said DCT coefficient to a value with an absolute value smaller than at least said original coefficient value:

$$n \times k - 1 \leq a \tag{10}$$

where,
- n is the highest order of the DCT coefficient and
- k is the compression rate shown by k in the case of compressing an image of m×n pixels to a similar image of (m×k)×(n×k) pixels, where 0<k<1.

6. An image decoding apparatus as set forth in claim 4, further comprising an image compressing means for compressing a size of said image data in a horizontal direction and vertical direction by any compression rate and
- wherein said DCT coefficient converting means converts the coefficient value of a term of a horizontal direction order $a_H$ satisfying equation 11 of said DCT coefficient and a vertical direction order $a_v$ satisfying equation 12 to a value with an absolute value smaller than at least the original coefficient value:

$$n_H \times k_H - 1 \leq a_H \tag{11}$$

$$n_v \times k_v - 1 \leq a_v \tag{12}$$

where,
- $n_H$, $n_v$ are the highest orders of the DCT coefficients in the horizontal direction and vertical directions and
- $k_H$, $k_v$ are the compression rates in the horizontal direction and vertical direction in the case of compressing an image of m×n pixels to $(m \times k_H) \times (m \times k_v)$ in said image compressing means, where $0 < k_H, k_v < 1$.

7. An image decoding process for decoding coded image data obtained by performing motion compensation prediction on continuous image data, performing DCT on the predictive error signal obtained as a result of said motion compensation prediction or said image data, quantizing the DCT coefficient obtained by said DCT, performing variable length coding on the quantized DCT coefficient, and thereby coding said continuous image data, said process comprising the steps of:
- performing variable length decoding on said coded image data to generate a quantized DCT coefficient,
- performing inverse quantization on said generated quantized DCT coefficient to generate a DCT coefficient,
- converting the coefficient value of a term of a frequency higher than a desired frequency limit, determined based on a compression rate, of said generated DCT coefficient,
- performing inverse DCT on the DCT coefficient converted in coefficient value to generate image data or a predictive error signal,
- using said generated predictive error signal to generate image data, and
- reducing the high frequency component of more than a desired frequency of the spatial frequency of the decoded image to decode the image.

8. An image decoding process as set forth in claim 7, wherein said DCT coefficient conversion converts the coefficient value of a term of an order a satisfying equation 13 of said DCT coefficient to a value with an absolute value smaller than at least said original coefficient value:

$$n \times k - 1 \leq a \tag{13}$$

where,
- n is the highest order of the DCT coefficient and
- k is the compression rate shown by k in the case of compressing an image of m×n pixels to a similar image of (m×k)×(n×k) pixels, where 0<k<1.

9. An image decoding process as set forth in claim 7, further comprising the steps of compressing a size of said image data in a horizontal direction and vertical direction by any compression rate and
- in said conversion of the DCT coefficient, converting the coefficient value of a term of a horizontal direction order $a_H$ satisfying equation 14 of said DCT coefficient and a vertical direction order $a_v$ satisfying equation 15 to a value with an absolute value smaller than at least the original coefficient value:

$$n_H \times k_H - 1 \leq a_H \tag{14}$$

$$n_v \times k_v - 1 \leq a_v \tag{15}$$

where,
- $n_H$, $n_v$ are the highest orders of the DCT coefficients in the horizontal direction and vertical directions and
- $k_H$, $k_v$ are the compression rates in the horizontal direction and vertical direction in the case of compressing an image of m×n pixels to $(m \times k) \times (m \times k_v)$ in said image compression, where $0 < k_H, k_v < 1$.

10. An image decoding apparatus for decoding image data coded using orthogonal transformation, comprising:
- an orthogonal transformation coefficient converting means for converting a coefficient value of a term of a frequency higher than a desire frequency limit, determined based on a compression rate, of an orthogonal transformation coefficient of said coded image data to a value with an absolute value smaller than at least the original coefficient value and
- an inverse orthogonal transformation means for performing inverse orthogonal transformation on said orthogonal transformation coefficient converted in coefficient value to generate spatial pixel data.

11. An image decoding apparatus as set forth in claim 10, wherein said orthogonal transformation coefficient converting means converts the coefficient value of a term of an order a satisfying equation 16 of said orthogonal transformation coefficient to a value with an absolute value smaller than at least said original coefficient value:

$$n \times k - 1 \leq a \tag{16}$$

where,
- n is the highest order of the DCT coefficient and
- k is the compression rate shown by k in the case of compressing an image of m×n pixels to a similar image of (m×k)×(n×k) pixels, where 0<k<1.

12. An image decoding apparatus as set forth in claim 10, further comprising an image compressing means for compressing a size of said image data in a horizontal direction and vertical direction by any compression rate and
- wherein said orthogonal transformation coefficient converting means converts the coefficient value of a term of a horizontal direction order $a_H$ satisfying equation 17 of said orthogonal transformation coefficient and a vertical direction order $a_v$ satisfying equation 18 to a value with an absolute value smaller than at least the original coefficient value:

$$n_H \times k_H - 1 \leq a_H \tag{17}$$

$$n_v \times k_v - 1 \leq a_v \tag{18}$$

where,
- $n_H$, $n_v$ are the highest orders of the DCT coefficients in the horizontal direction and vertical directions and $k_H$, $k_v$ are the compression rates in the horizontal direction and vertical direction in the case of compressing an image of m×n pixels to (m×k)×(m×k$_v$) in said image compressing means, where 0<$k_H$, $k_v$<1.

13. An image reproduction apparatus for decoding image data coded using DCT, compressing it by a desired compression rate and reproducing the same, comprising:

a DCT coefficient converting means for converting the coefficient value of a term of a frequency higher than a frequency limit, determined based on said compression rate, of the DCT coefficient of said coded image data into a value with an absolute value smaller than at least the original coefficient value, an inverse DCT means for performing inverse DCT on the DCT coefficient converted in coefficient value to generate spatial pixel data, an image compressing means for thinning the pixels of the spatial pixel data generated by said inverse DCT means so as to compress the size of the image data comprised of said generated spatial pixel data by said compression rate, and a display means for displaying said compressed image.

14. An image reproduction apparatus as set forth in claim 13, wherein said DCT coefficient converting means converts the coefficient value of a term of an order a satisfying equation 19 of said DCT coefficient to a value with an absolute value smaller than at least said original coefficient value:

$$n \times k - 1 \leq a \quad (19)$$

where, n is the highest order of the DCT coefficient and k is the compression rate shown by k in the case of compressing an image of m×n pixels to a similar image of (m×k)×(n×k) pixels, where 0<k<1.

15. An image reproduction apparatus as set forth in claim 13, wherein said image compressing means compresses a size of said image data in a horizontal direction and vertical direction by any compression rate and said DCT coefficient converting means converts the coefficient value of a term of a horizontal direction order $a_H$ satisfying equation 20 of said DCT coefficient and a vertical direction order $a_v$ satisfying equation 21 to values with an absolute value smaller than at least the original coefficient value:

$$n_H \times k_H - 1 \leq a_H \quad (20)$$

$$n_v \times k_v - 1 \leq a_v \quad (21)$$

where, $n_H$, $n_v$ are the highest orders of the DCT coefficients in the horizontal direction and vertical directions and $k_H$, $k_v$ are the compression rates in the horizontal direction and vertical direction in the case of compressing an image of m×n pixels to (m×k)×(m×k$_v$) in said image compressing means, where 0<$k_H$, $k_v$<1.

16. An image reproduction apparatus as set forth in claim 13, wherein said coded image data is coded image data obtained by performing motion compensation prediction on continuous image data, performing DCT on the predictive error signal obtained as a result of said motion compensation prediction or said image data, quantizing the DCT coefficient obtained by said DCT, and performing variable length coding on the quantized DCT coefficient, further comprising a variable length decoding means, an inverse quantizing means, and a motion compensation prediction means, said variable length decoding means performing variable length decoding on said coded image data to generate a quantized DCT coefficient, said inverse quantizing means performing inverse quantization on said generated quantized DCT coefficient to generate a DCT coefficient, said DCT coefficient converting means converting the coefficient value of a term of a frequency higher than a desired frequency limit of said generated DCT coefficient to a value with an absolute value smaller than at least the original coefficient value, said inverse DCT means performing inverse DCT on the DCT coefficient converted in coefficient value to generate image data or a predictive error signal, said motion compensation predicting means using said generated predictive error signal to generate spatial pixel data, the pixels of said spatial pixel data generated by said inverse DCT means and said motion compensation prediction means being thinned so as to compress the size of the image data comprised by said generated spatial pixel data by said compression rate, and said display means displaying said compressed image.

17. An image reproduction apparatus as set forth in claim 13, wherein said coded image data is image data coded by the MPEG-1 and further comprising a reading means for reading said coded image data recorded on a video CD.

* * * * *

UNITED STATES PATENT AND TRADEMARK OFFICE
CERTIFICATE OF CORRECTION

PATENT NO. : 5,905,846
DATED : May 18, 1999
INVENTOR(S) : Yukihisa TSUNEDA et al.

It is certified that error appears in the above-identified patent and that said Letters Patent is hereby corrected as shown below:

Column 12, line 19, claim 9, line 18 should read
-- image of m×n pixels to $(m \times k_H) \times (m \times k_v)$ in said image --.

Column 13, line 3, claim 12, line 19 should read
-- image of m×n pixels to $(m \times k_H) \times (m \times k_v)$ in said image --.

Column 14, line 6, claim 15, line 19 should read
-- image of m×n pixels to $(m \times k_H) \times (m \times k_v)$ in said image --.

Signed and Sealed this

Twentieth Day of June, 2000

Attest:

Q. TODD DICKINSON

*Attesting Officer*     *Director of Patents and Trademarks*